Jan. 3, 1928.

G. LICHTSCHEINDL 1,655,276

ELECTRIC MEASURING SYSTEM

Filed Dec. 30, 1924

2 Sheets-Sheet 1

Inventor:
Geza Lichtscheindl,
by *Alexander S. Lent*
His Attorney.

Jan. 3, 1928.  G. LICHTSCHEINDL  1,655,276
ELECTRIC MEASURING SYSTEM
Filed Dec. 30. 1924   2 Sheets-Sheet 2
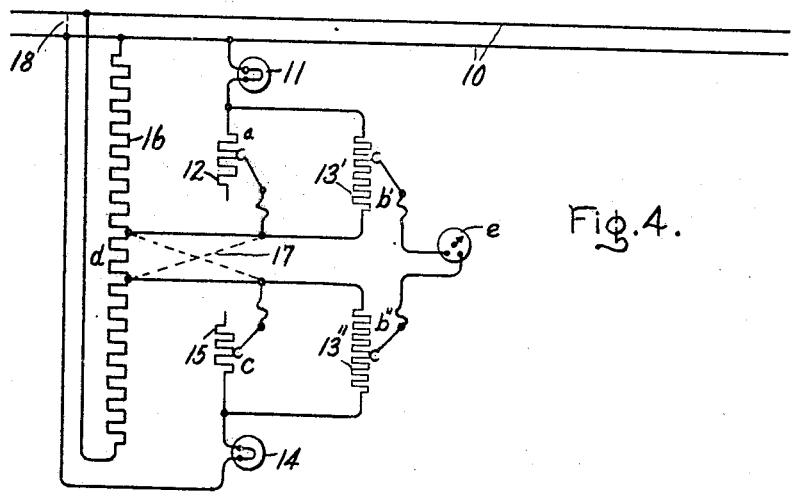
Fig.4.
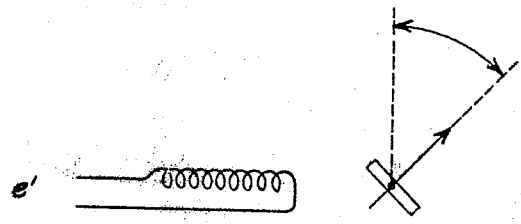
Fig.5.
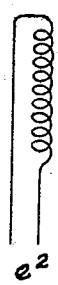
Inventor:
Geza Lichtscheindl,
by Alexander S. Lind
His Attorney.

Patented Jan. 3, 1928.

1,655,276

UNITED STATES PATENT OFFICE.

GÉZA LICHTSCHEINDL, OF BELGRAD, SERBIA, ASSIGNOR TO GENERAL ELECTRIC COMPANY, A CORPORATION OF NEW YORK.

ELECTRIC MEASURING SYSTEM.

Application filed December 30, 1924, Serial No. 758,966, and in Germany January 30, 1924.

My invention relates to an electric measuring system or circuit by means of which the algebraic relation of various variable quantities represented in the circuit by resistances may be directly indicated. The main object of the invention is to provide a measuring circuit or system which will indicate directly such results as may be indirectly obtained by the use of a Wheatstone bridge. Thus, with the Wheatstone bridge, it is possible to obtain the products and corresponding quotients of electric resistances. However, the nature of the Wheatstone bridge is such that a zero indicating instrument must be used and the actual measurement reading taken from adjustable resistances. By means of my invention the algebraic relation of variable resistances, which may represent variable quantities, is directly indicated on an electrical measuring instrument, the deflection of which corresponds to the answer of the algebraic expression to be solved.

In carrying my invention into effect, I provide a circuit made up of a relative low variable resistance and a relatively high constant resistance connected in parallel, provide means for passing a constant current through this circuit and connect a measuring instrument across a variable portion of the high resistance. The variable resistance and that portion of the constant resistance across which the instrument is connected represent variable factors to be considered algebraically. Two or more such groups may be combined in various ways as explained hereinafter to automatically and electrically solve involved algebraic expressions.

Figure 1:
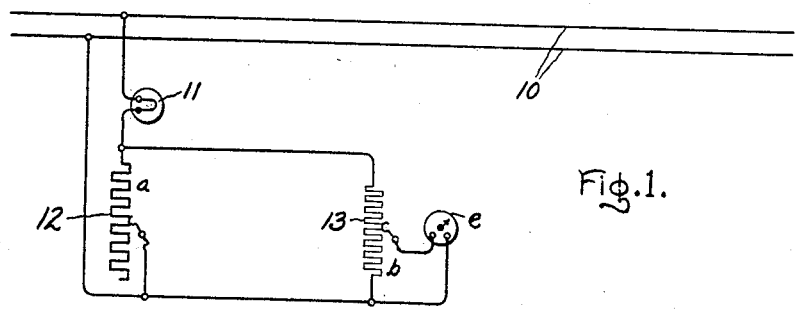
Figure 2:
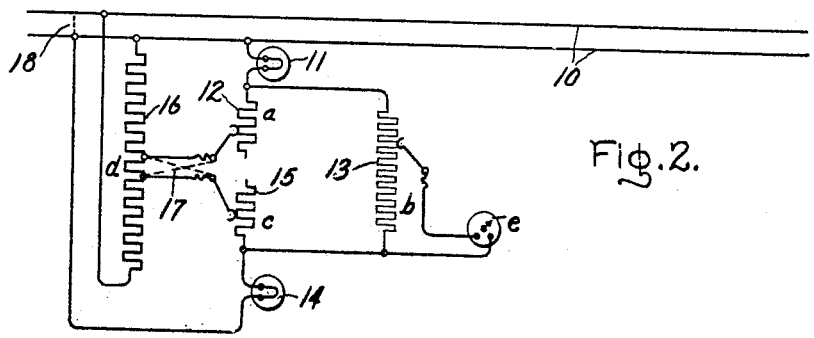
Figure 3:
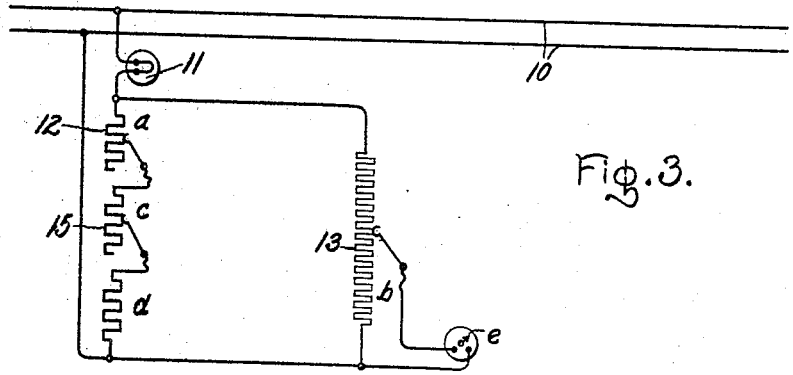

The features of my invention which are believed to be novel and patentable will be pointed out in the claims appended hereto. For a better understanding of my invention reference is made in the following description to the accompanying drawings wherein Fig. 1 represents a simple embodiment of my invention for solving simple equations of the form $a \times b \times k = e$. In Fig. 2 the invention is arranged for solving equations of the form $(a \pm d \pm c)bk = e$. Fig. 3 represents a simplified arrangement of the circuit of Fig. 2 for solving equations of the form $(a+d+c)bk = e$. Fig. 4 represents a circuit arrangement for solving equations of the form $k(a \times b' \pm cb'' \pm d) = e$.

Referring now to Fig. 1, 10 represents an ordinary source of potential which may be either direct or alternating and which is not necessarily absolutely constant. To obtain a constant current from this source, I provide in this instance, a suitable resistance element represented at 11 which will allow a substantially contant current to flow through it irrespective of considerable variations in voltage across it. A fine iron wire having a high temperature coefficient of resistance in a vacuum tube and operated at incandescence is suitable for this purpose. Connected across the circuit 10 in series with the constant current device 11 is a variable resistance 12 and the active part of this resistance, which may represent some variable quantity to be considered, is designated by the letter $a$. In shunt to the resistance $a$ is another resistance 13 which is a very much higher resistance than 12 and connected across a variable portion $b$ of the high resistance 13 is a voltmeter represented at $e$. The variable part $b$ of the high resistance may be representative of some other variable quantity to be considered. The resistance of the voltmeter is also very high as compared to the resistance 12 and for all practical purposes, the current $i$ which flows through the resistance $a$ may be considered to be constant irrespective of changes in the position of the voltmeter tap without introducing appreciable error in the result to be obtained. The voltmeter deflection $e$ will then be proportional to the resistance voltage drop in the resistance $a$ times the ratio of the resistance part $b$ to the total resistance 13. Thus, $$e = ia\frac{b}{13} = a \times b \times k$$

where $k$ is a constant.

As a practical application of the use of this measuring circuit, the resistance $a$ may be made to vary as the torque of a motor and the resistance part $b$ as the speed of the motor; the instrument $e$ then would indicate the power output of the motor. This principle may be employed in widely different modifications and combinations and for the measurement of intricately involved algebraic functions, the variable or variables of which are represented by ohmic resistances.

In Fig. 2 the elements corresponding to 11 and 12 in Fig. 1 are duplicated by elements 14 and 15 and the variable part of the resistance 15 is represented by the letter $c$. In addition there is connected across the source 10 a graduated resistance element 16 from which may be obtained another quantity represented by the letter $d$ indicative of that part of the resistance 16 between the points where the connections are made to resistances 12 and 15. Resistance elements 11 and 14 are provided to keep the current in the resistance parts $a$ and $c$ constant and these resistances as well as the part $d$ are low as compared to the resistance element 13 shunted across the resistances $a$, $d$ and $c$. Provision is made for reversing the leads to the resistance part $d$ as indicated in dotted lines at 17 so as to add or subtract the factor represented by the resistance $d$. Provision is also made to connect the lead from resistance element 14 to the source 10 to either side as indicated by the dotted line at 18, so as to add or subtract the factor represented by the resistance $c$.

Assuming constant voltage of the source 10, the voltage drop in $d$ will be constant for a given setting thereof since the currents flowing through branches $a$ and $c$ are maintained constant by the resistance elements 11 and 14. The voltage impressed on resistance 13 is composed of the algebraic sum of the voltage drop in $a$, $d$ and $c$, and the part of that voltage impressed upon the voltmeter is proportional to $\frac{b}{13}$. For the connections represented in full lines, the following equation applies:

$$e = k(a+d-c)\frac{b}{13}$$

where $k$ is a constant or $e=(a+d-c)\,bk_1$ where $k_1$ is another constant.

For the connections represented in dotted lines, the equation becomes $$e=(a-d+c)\,bk_2.$$

If we reverse the leads as indicated in dotted lines at 17 but leave the connection from 14 to the line, as represented in full lines, the equation becomes $$e=(a-d-c)\,bk_2.$$

Thus we have in Fig. 2 a circuit arrangement for solving equations of the form $$e=(a\pm d\pm c)\,bk_2.$$

Where the signs of $d$ and $c$ are always positive, the circuit arrangement may be simplified as represented in Fig. 3. Here the parts corresponding to those of Fig. 2 are similarly designated, $d$ representing a constant factor and $a$, $b$ and $c$ factors which may be varied. The equation for Fig. 3 is $$e=(a+b+d)\,bk_2.$$

Fig. 4 represents a further modification of the circuit arrangement which is similar to that represented in Fig. 2 except that the high resistance element to which the voltmeter $e$ is connected is divided into two parts 13' and 13'', with variable portions $b'$ and $b''$ which may represent factors to be considered in the algebraic expression. From the explanation previously given, it will be evident that the arrangement of Fig. 4 gives the general equation $$e=k(a\times b'\pm c\times b''\pm d).$$

Two relatively independent voltages corresponding to $e$ in any of the above equations may be combined in a single instrument of the wattmeter type to obtain the product, $e'\times e''$, or the ratio of $\frac{e^1}{e^2}$ by means of a two coil instrument having the coils displaced by 90° and acting on a common movable indicator provided with a magnetic armature as represented in Fig. 5. The angle of deflection will then represent the ratio $\frac{e^1}{e^2}$.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. In an electric measuring system, a source of potential, a measuring circuit comprising a relatively low variable resistance and a relatively high constant resistance connected in parallel, connections from said source to said measuring circuit including means for passing a constant current therethrough, and a measuring instrument connected across a variable portion of said constant resistance.

2. In an electric measuring system, a source of potential, a measuring circuit comprising a relatively low variable resistance and a relatively high constant resistance connected in parallel, connections from said source to said measuring circuit including an iron wire resistance enclosed in a vacuum and operated at incandescence for maintaining the current flow through the measuring circuit constant, a measuring instrument and means for connecting said instrument across a variable portion of said high constant resistance.

3. A measuring system comprising a plurality of resistances some of which are variable, a source of supply, means for individually supplying constant currents to the variable resistances from said source, means for impressing a voltage across the other of said resistances, and means for measuring a variable portion of the algebraic sum of the voltages across said resistance.

4. An electric measuring system comprising a source of supply, a measuring circuit comprising relatively high and relatively low resistance branches connected in parallel, the low resistance branch including two variable resistances and a constant resistance and the high resistance branch comprising a constant resistance across a variable portion of which is shunted a measuring instrument, circuit connections for impressing a portion of the voltage of said source of supply across the constant resistance of the low resistance path, circuit connections for passing current from said source through the variable resistances, and means for maintaining the current flowing through the variable resistance substantially constant.

5. An electric measuring system according to claim 4, characterized by the fact that means are provided for reversing the direction of the potential impressed upon the constant resistance of the low resistance circuit with respect to the voltages impressed upon the variable resistances.

6. An electric measuring system according to claim 4, characterized by the fact that means are provided for reversing the direction of current flow through one of the variable resistances with respect to the direction of current flow through the other variable resistance.

In witness whereof, I have hereunto set my hand this 12th day of December, 1924.

GÉZA LICHTSCHEINDL.